United States Patent [19]

Iwata et al.

[11] Patent Number: 4,749,894

[45] Date of Patent: Jun. 7, 1988

[54] SUBMERSIBLE MOTOR USING A WATER-TIGHT WIRE AS THE PRIMARY WINDING

[75] Inventors: Minoru Iwata; Kiyohiko Sano, both of Kanagawa, Japan

[73] Assignee: Ebara Corporation, Tokyo, Japan

[21] Appl. No.: 931,939

[22] Filed: Nov. 18, 1986

Related U.S. Application Data

[63] Continuation of Ser. No. 710,238, Mar. 11, 1985, abandoned and a Continuation-in-part of Ser. No. 527,760, Aug. 30, 1983, abandoned.

[30] Foreign Application Priority Data

Sep. 6, 1982 [JP] Japan ................................. 57-153862

[51] Int. Cl.$^4$ ............................................ H02K 5/12
[52] U.S. Cl. ........................................ 310/87; 310/45; 310/180; 310/208; 174/120 SR; 428/383
[58] Field of Search ..................... 310/87, 261, 45, 43, 310/208, 180, 184, 254; 174/120 SR, 23 C; 428/383, 522

[56] References Cited

U.S. PATENT DOCUMENTS

| | | | |
|---|---|---|---|
| 2,427,507 | 9/1947 | Powell et al. ................ | 174/120 SR |
| 2,654,848 | 10/1953 | Schaeffer ..................... | 310/87 |
| 2,944,297 | 7/1960 | Maynard ...................... | 310/87 |
| 3,692,925 | 9/1972 | Kindij .......................... | 174/129 SR X |
| 3,842,298 | 10/1974 | Schaeffer ..................... | 310/87 |
| 3,944,717 | 3/1976 | Hacker et al. ................. | 174/23 C |
| 4,216,263 | 8/1980 | Otis et al. ..................... | 174/120 SR X |
| 4,346,136 | 8/1982 | Lupinski ....................... | 174/120 SR X |
| 4,547,689 | 10/1985 | Tsuchimoto ................... | 310/87 |

FOREIGN PATENT DOCUMENTS

| | | |
|---|---|---|
| 25-1401 | 2/1949 | Japan . |
| 45-33140 | 10/1970 | Japan . |
| 47-33449 | 10/1972 | Japan . |
| 48-1711 | 11/1973 | Japan . |
| 53-8712 | 1/1978 | Japan . |
| 53-65516 | 6/1978 | Japan . |
| 55-37823 | 3/1980 | Japan . |
| 55-81416 | 6/1980 | Japan ............................ 174/120 SR |
| 55-33568 | 9/1980 | Japan ............................ 174/120 SR |
| 0730812 | 6/1955 | United Kingdom ......... 174/120 SR |

OTHER PUBLICATIONS

"Vinyl Chloride and Polymer", vol. 6, No. 5, (translation of p. 16); H. Ono et al., Fujikura Cable Works, Japan; 5/1966.

"Vinyl Chloride and Polymer", vol. 6, No. 9, (translation of pp. 27-29); Kawawata, Hitachi Cable Ltd., Japan; 9/1966.

"Vinyl Chloride and Polymer", vol. 8, No. 6 (translation of pp. 2, 3); Editorial Staff Writers, Electric Co. Ltd, Japan; 6/1968.

Plastic Material Course (18) Vinyl Chloride Resin (7th edition, published on Oct. 10, 1979 by the Nikkan Kogyo Shimbun, Ltd.), Masayuki Furuya.

Primary Examiner—R. Skudy
Attorney, Agent, or Firm—Oblon, Fisher, Spivak, McClelland & Maier

[57] ABSTRACT

A submersible motor having a primary winding made of a water-tight wire has an improved life characteristic. The water-tight wire is made of a conductor and three layers formed on the conductor. The three layers are a heat-resistant enamel layer, a main insulating layer and an outer protective layer. The main insulating layer is composed of crosslinked polyethylene or a polypropylene. The outer protective layer is composed of a polyvinyl chloride composition having as a base material a polyvinyl chloride having a number average polymerization degree of 2000 or higher.

6 Claims, 4 Drawing Sheets

Fig. 3
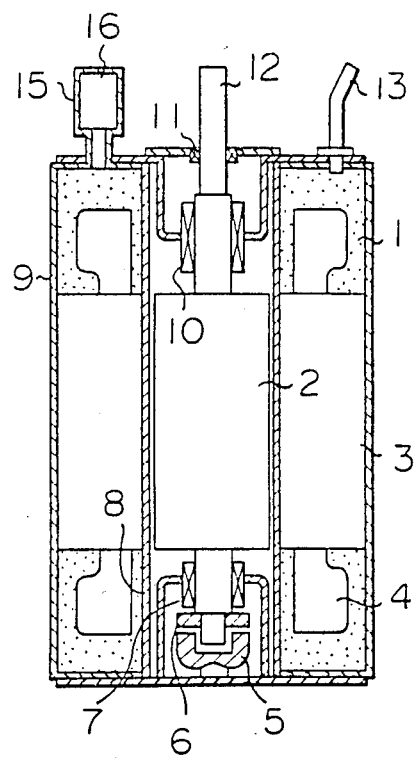
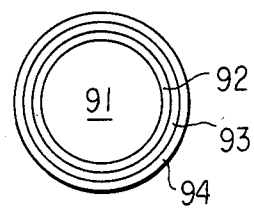
Fig. 6

SUBMERSIBLE MOTOR USING A WATER-TIGHT WIRE AS THE PRIMARY WINDING

This application is a continuation, of application Ser. No. 710,238, filed Mar. 11, 1985 now abandoned 1/17/87. This is a continuation-in-part application of Ser. No. 527,760, filed Aug. 30, 1983.

BACKGROUND OF THE INVENTION

1. Field of the Invention

This invention relates generally to a submersible motor and more particulary to a submersible motor having a primary winding constituted by a water-tight wire having an excellent dielectric breakdown characteristic, a high exterior damage resistance and an excellent water-tree-proofness. The motor, as a result of the characteristics of the primary winding has a markedly enhanced life characteristic.

2. Description of the Prior Art

The most commonly used submersible motors are those of the water-tight type which are filled with water when in service. Since water-tight type submersible motors are always used in the water, the water resistance of their insulation system, particularly the winding, is the most important factor in the determination of its reliability and life.

Many kinds of insulating wires with varying structure have been used for the windings in submersible motors. The more commonly employed wires have three insulating layers: an enamel layer (innermost layer), a main insulating layer (middle layer) and an outer protective layer (outermost layer). For the enamel layer, a polyvinyl formal polymer, a polyester polymer, an epoxy polymer or a polyamideimide polymer is used. The function of this layer is not completely understood except that it acts as a copper damage-shielding layer when the conductor is a soft copper wire. Moreover, it is empirically known that this layer prolongs the life of submersible motor windings.

As the main insulating layer polyethylene, particularly crosslinked polyethylene and polypropylene, are widely used because they excel in water resistance, are low in price and good in processability compared with other kinds of polymers. However, insulated wires with a main insulating layer composed of these polymers, when used in a submersed conditions, have the drawback that the main insulating layer is locally deteriorated by water treeing in a short period of time. In order to overcome this drawback, the use of a mixture of a crystalline polypropylene and an ethylene-propylene rubber or an ethylene-propylene terpolymer as the main insulating layer has been proposed in Japanese Patent Publication No. 33140/1970. However, the combination of the abovementioned enamel layer and this main insulating layer alone is not able to provide satisfactory characteristics.

While a crosslinked polyethylene and polypropylene are suitable from the point of view of dielectric strength and economy, they are not necessarily superior in their resistance to exterior damage. Accordingly, when these polymers are used as the outermost insulating layer, the wire surface may be scratched during winding and other operations, thereby causing the deterioration of the insulation and the breaking of the wire. In order to prevent this phenomenon, the main insulating layer is generally covered by an outer protective layer composed of a material having a high resistance to exterior damage. For example, the use of a covering of polyamide polymer is proposed in Japanese Patent Public Disclosure (Laid-Open) No. 37823/1980. Although polyamide polymers are superior in exterior damage resistance, they are inferior in water-sealing properties. Therefore, the polymers cannot sufficiently prevent water penetration into the main insulating layer composed of polyethylene or polypropylene and accordingly cannot effectively prevent the deterioration of the main insulating layer due to a water treeing phenomenon.

Thus, water-tight wires having a conventional outer protective layer composed of a polyamide polymer have had the drawback that, when used as the windings in a submersible motor, their insulation deteriorates in a short period of time and thus they cannot withstand long-term use.

SUMMARY OF THE INVENTION

Accordingly, one object of this invention is to provide a novel submersible motor having markedly improved life characteristics and containing a superior water-tight wire which has strong water proofing properties and sufficient damage resistance. This wire prevents water penetration and therefore prevents the occurrence of water-treeing in the main insulating layer. The motor is therefore capable of long term use.

Another object of this invention is to provide an improved canned motor having a highly insulative and thermally conductive liquid which fills the space in the stator chamber so that the primary coils which are made of water-tight wire having superior water proofing properties and damage resistance are immersed in the liquid whose thermal expansion is absorbed by an empty space or other expansion absorbing device.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3 is a sectional view of another embodiment of the protection means for the stat r chamber;

FIG. 6 is a cross-sectional view of the coated wire of the present invention.

DESCRIPTION OF THE PREFERRED EMBODIMENTS

Figure 1:
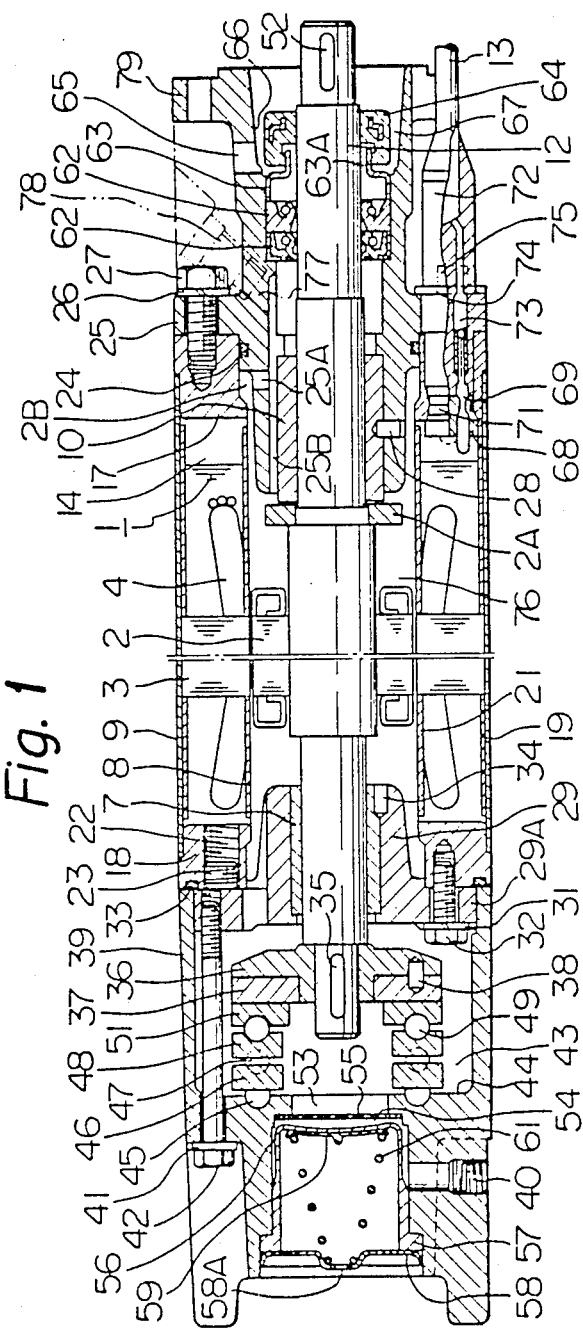
FIG. 1 is a sectional view of an embodiment of the canned motor according to the present invention.

Referring now to the drawings wherein like reference numerals designate identical or corresponding parts through the several views, and more particularly to FIG. 1 thereof, where is shown a motor frame 9 of a cylindrical metal plate work construction. Inside the motor frame is secured a stator 3 and at the opposite ends of the motor frame are fit an upper frame member 17 and a lower frame member 18 respectively. At the location corresponding to the inner diametral periphery of said upper and lower frame members is welded a can 8 for the stator which together with said motor frame 9 and the respective frame members 17 and 18 provides a chamber 1 for the stator. In other words, the motor frame 9 and the can 8 for the stator are positioned closely respectively to the outer and inner surfaces of the stator 3. Numerals 19 and 20 designate the insulating paper at the ends of the primary coils 4 of the stator 3.

The space available in the chamber 1 for the stator is filled with a highly insulative and thermally conductive liquid such as insulating oil for transformers, while an empty space 14 is provided at the upper portion for the chamber 1 for absorbing the thermal expansion of said liquid. It is to be noted that the primary coil 4 is to be fully immersed in the liquid. Alternatively, as shown in FIG. 3 which shows an alternate embodiment according to the present invention, a means 15 for absorbing the thermal expansion may be provided, which is connected to the chamber 1 for the stator 3 and provided with an absorption space 16 with the interior being in communication with the chamber 1 for the stator.

An upper bracket 25 is fit into the upper frame member 17 with a seal ring 24 therebetween. Bolts 27 are screwed into the upper frame member 17 with spring washers 26 through the bores provided at the flange of the upper bracket 25. An upper radial bearing 10 is fit into the upper bracket 25 with a lock pin 28 for preventing rotation, the pin 28 radially extending between the upper bracket 25 and the radial bearing 10.

A communication channel 25B is provided in the upper bracket 25 so as to communicate with the end of a slanted inlet port 77 for the liquid to be put in chamber, and a bore 25A in communication with said communication channel 25B is drilled radially through the upper bracket 25 at the uppermost part 2B of the chamber for the rotor and at the lower part of the upper bracket 25. Owing to the above construction, when the motor is put in an upright position, the air contained in the uppermost part 2B of the chamber for the rotor will tend to move upwardly, while the liquid for filling the chamber will flow downwardly through the communication channel 25B, whereby the air in the chamber for the stator may be replaced with the liquid and hardly any air will be left therein.

A lower bracket 29 is fit into the lower frame member 18. Bolts 32 are screwed into the lower frame member 18 with spring washers 31 through the through bores provided in the flange part of the lower bracket 29. A seal ring 33 is disposed intermediately between the lower end of the lower frame member 18 and a thrust housing 39 (see FIG. 2). About half of the seal ring 33 is arranged to be fit in a circumferential groove provided adjacent the outer side surface of the frame 9 on the lower surface of the lower frame member 18. The seal ring 33 is depressed in the groove by the surface of the lower bracket 29, the depression being partially at the portion nearer the inner diameter of the ring. The remaining part of the ring 33 is depressed by the upper end of the thrust housing 39. Numeral 23 designates an inlet for the liquid to be put in the chamber 14 for the stator. Numeral 24 designates a plug screwed into the inlet 23. Into the lower bracket 29 is inserted radial bearing 7 and a lock pin 34 for preventing the rotation is axially fit in the end of the part where the lower bracket 29 and the lower radial bearing 7 are joined.

The upper radial bearing 10 and the lower radial bearing 7 receive a motor shaft 12 having the rotor 2 fit and secured thereto with a slight clearance between the rotor and the can 8 for the stator. Numeral 2A designates a balancing ring adapted to adjust the dynamic balance of the rotary body including all the rotating members around the shaft 12.

At the lower end of the motor shaft 12 is fit a thrust disc 36 with a key 35 so that the disc is rotated with the shaft 12. To the thrust disc 36 is attached a thrust carbon plate 37 and through the abutting surfaces of both the thrust disc 36 and the thrust carbon plate 37, a lock pin 38 is axially fit for preventing relative rotation therebetween.

The thrust housing 39 having the same outer diameter as the motor frame 9 is fit on the lower bracket 29. As mentioned above, when the thrust housing 39 abuts the lower frame member 18, it depresses with its upper end surface the seal ring 33. Bolts 42 are screwed into the lower bracket 29 together with seal washers 41 which serve to seal the holes for bolts. Thus, the lower frame member 18 and the thrust housing 39 are sealingly pressed against each other. Numeral 40 designates the outlet port for drawing the liquid.

Thrust pins 45 each having a configuration of a semi-spherical shape cross-section, rest on the bottom wall 44 of the bearing chamber 43 of the thrust housing 39 with their flat surfaces facing upwardly. The lower alignment collar 46 having a flat under-surface is in abutment with the thrust pins 45. At the spherical dents provided on the lower alignment collar 46 are fit those alignment balls 47 are displaced in phase by 90 degrees in its planar arrangement relative to the thrust pins 45. The alignment balls 47 also fit in the spherical recesses provided in the under-surface of the upper alignment collar 48. The upper-surface of the upper alignment collar 48 provides the surface on which the thrust bearing may roll and rolling balls 49 are circumferentially arranged. The lower thrust bearing 51 rests on the rolling balls with the lower thrust bearing 51 abutting the carbon plate 37. In this way, the lower thrust bearing 51 receives a load comprising the weights of the thrust carbon plate 37, thrust disc 36, motor shaft 12, rotor 2, balancing ring 2A, key 52 provided at the output end of the motor shaft, the shaft coupling (not shown) secured to one end of the motor shaft (not shown) and the like, as well as the thrust caused by the operation of the pump. At the lower part of the thrust housing 39 is provided a cylindrical chamber 54 for a diaphragm, the diameter of which is made larger than the central hole 53 provided in the bottom wall 44 of the bearing chamber 43. Between the diaphragm chamber 54 and the bearing chamber 43 is provided a perforated partition plate 55 secured to the thrust housing 39. A diaphragm 56 made of rubber and of a cylindrical vessel configuration is provided in the diaphragm chamber 54 and a retainer plate 58 having a bore 58A is pressed into the cylindrical bore provided in the lower end of the thrust housing 39 so as to depress the outer flange 57 of the diaphragm 56. Between the retainer plate 58 and a spring receiving plate 59 in abutment with the bottom surface of the diaphragm 56 is provided in a compressed condition a spring 61 of a conical configuration.

In order to seal the motor shaft 12, such sealing devices as oil seals 62 are inserted in the upper bracket 22. In succession to said oil seals 62, a seal cover 63 of two stepped cylindrical configuration is pressed in the upper bracket 25, and, in succession thereto, a sand slinger 64 is secured to the motor shaft 12. The lip of the sand slinger 64 is in abutment with the cylindrical outer periphery of the cylindrical outer periphery of the cylindrical part 63A of smaller diameter of the seal cover 63. A radial hole 65 is drilled through the upper bracket 25 between the sand slinger 64 and the seal cover 63. The hole 65 serves to discharge the sand, mud and the like contained in the liquid which may enter into the space 67 defined by the seal cover 63, the sand slinger 64 and the opposing wall of the central hole 66 of the uper bracket 25. The sand slinger 64 also serves as a water separation means by way of centrifugal force.

The lead wire for the stator coils 4 is soldered to one end of the motor terminal 69, the center of which section is seen to be almost circumferentially parallel to the terminal base 68 which is elongated circumferentially and has a rectangular vertical section. The terminal base 68 is sealingly pressed into and secured to the upper frame member via a sealing ring 71. The other end of the motor terminal 69 is provided bifurcated terminals which are resilient outwardly and the cable pin 73 molded to a flat cable 72 having a connector is adapted to be inserted in the other end of the motor terminal 69. The flat cable 72 is fixed by the bolt 75 screwed into the upper bracket 25 through the hole for the bolt provided in the metallic retaining member 74 for the cable fit on the outer circumference of the flat cable. The wires are combined from the flat cables 72 and arranged to be continuous with the round lead wire 13.

An inlet port 77 for the liquid to fill in the space in the motor for the chamber 1 for the stator is inclined so as to facilitate flow of the liquid from the outside. The port 77 is sealingly plugged with a plug 78.

Such a canned motor is in use connected at the end of the motor shaft 12 with the shaft of a pump and coupled with a pump having the same diameter as the canned motor by way of the installation flange 79 of the upper bracket 25 and installed together with the pump in a deep well.

Since the canned motor is installed in a water well and is normally submerged, it is important that the wire of the primary winding 4 be made of water-tight wire. According to the present invention, as shown in FIG. 6 this wire 90 is comprised of a conductor 91 and three layers surrounding the conductor, a heat-resistant enamel layer 92, a main insulating layer 93 and an outer protective layer 94. The main insulating layer is composed of a crosslinked polyethylene or polypropylene. The outer protective layer is composed of polyvinyl chloride and has, as a base material, polyvinyl chloride having a number average polymerization degree of greater than 2000.

The essential feature of this water-tight wire is that the wire uses, as its outer protective layer, a crosslinked or non-crosslinked polyvinyl chloride composition which has a base material polyvinyl chloride having a number average polymerization degree of at least 2000, preferably between 2000 and 3500. When a polyvinyl chloride having a number average polymerization degree of at least 2000 is used as the outer protective layer, the resulting coating wire is superior in water-sealing properties when compared with coated wires using a polyamide resin and sufficiently suppresses the water treeing phenomenon of the main insulating layer composed of, for example, a crosslinked polyethylene. When the polyvinyl chloride has a number average polymerization degree less than 2000, its waterproofing ability is equivalent to or less than that of a polyamide resin. Further, the polyvinyl chloride having the above-mentioned polymerization degree provides satisfactory resistance to exterior damage, which is required when the winding is inserted into the motor slot, as well as satisfactory coatability. As the number average polymerization degree of the polyvinyl chloride increases, its waterproof property increases. However, a number average polymerization degree exceeding 3500 is not desirable since such a polyvinyl chloride has worsened processability.

When polyvinyl chloride is used as an outer protective layer provided on the main insulating layer, it can contain, if necessary for processing requirements, plasticizers, stabilizers, lubricants, fillers and pigments which are all used in ordinary polyvinyl chlorides. Further, a crosslinked polyvinyl chloride can be used which is obtained by adding crosslinking co-agents to a polyvinyl chloride and irradiating the resulting mixture with ionizing radiation. The mechanical strength of the outer protective layer at high temperatures is therefore improved.

As the main insulating layer in the water-tight wire, a crosslinked polyethylene or a polypropylene is used. This polymer, in combination with the outer protective layer discussed above, maintains its original insulation resistance for long periods of time without causing a water-treeing phenomenon. The crosslinked polyethylene coating layer can be formed by first extrusion-coating polyethylene on the enamelcoated wire and then crosslinking the polyethylene by exposing the coated wire either to iodizing radiation or to a silane compound (Japanese Patent Publication No. 1711/1973). The resulting layer, especially when the crosslinking is accomplished by exposing the coated wire to electron rays scarcely causes void formation and accordingly maintains water resistance for long periods of time. For the polypropylene, a crystalline polypropylene is desirable which enables the use of a larger current capacity and has excellent resistance to environmental stress cracking.

The heat-resistant enamel layer can be formed by coating one of the aforementioned polymers of conventional use in the form of a varnish. Of these polymers, a polyamide-imide and epoxy polymer which are difficult to hydrolyze in a submerged state and which have excellent heat resistance are desirable.

In order to better understand the present invention, the following examples are presented. It should be understood however, that the invention is not limited or restricted by these examples.

EXAMPLES 1 to 4, COMPARATIVE EXAMPLES 1 to 4

In Examples 1 to 4 and Comparative Examples 1 to 4, a polyamideimide enamel wire (Furukawa AI wire manufactured by the Furukawa Electric Company Limited) having an outside diameter of 2.4 mm whose baked enamel film has a thickness of 0.03 mm was employed. The conductor of the wire was a soft copper wire and the polymer forming the heat-resistant enamel layer was a polyamideimide polymer used in the form of varnish. The polyethylene composition (hereinafter to be referred to as composition A) constituting the main insulating layer as well as polyvinyl chloride compositions (hereinafter to be referred to as compositions B, C, D and E) forming the outer protective layer were as follows.

Composition A
Rexlon W 2000                                100 parts by weight
(low density polyethylene
manufactured by Nippon
petrochemical Co., Ltd.)
Antioxidant Nocrac 300                       0.3 parts by weight
            (manufactured by
            Ouchi Shinko Chemical
            Industrial Co., Ltd)
Composition B
NIPOLIT CL                                   100 parts by weight
(polyvinyl chloride of 2500
number average polymerization
degree manufactured by Chisso
Corporation)
Stabilizer   Sinaka Lead TS G                7 parts by weight
             (tribasic lead sulfate)
             manufactured by
             Shinagawa Chemical
             Industries Co., Ltd.)
Plasticizer  Adkcizer C-8                    40 parts by weight
             (manufactured by Adeka)
             Argus Chemical Co., Ltd.)
Lubricant    Sinaka Lead DS-2                1 part by weight
             (dibasic lead stearate)
             manufactured by
             Shinagawa Chemical
             Industries Co., Ltd.)
Composition C
101 EP                                       100 parts by weight
(polyvinyl chloride of 1450
number average polymerization
degree manufactured by Nippon
Zeon Co., Ltd.)
Stabilizer   Sinaka Lead TS-G                7 parts by weight
Plasticizer  Adkcizer C-8                    40 parts by weight
Lubricant    Sinaka Lead DS-2                1 part by weight
Composition D
NIPOLIT CR                                   100 parts by weight
(polyvinyl chloride of 2100
number average polymerization
degree manufactured by Chisso
Corporation)
Stabilizer   Sinaka Lead TS-G                7 parts by weight
Plasticizer  Adkcizer C-8                    40 parts by weight
Lubricant    Sinaka Lead DS-2                1 part by weight
Composition E
TK-2500 R                                    100 parts by weight
(polyvinyl chloride of 3800
number average polymerization
degree manufactured by Shinetsu
Chemical Co., Ltd.)
Stabilizer   Sinaka Lead TS-G                7 parts by weight
Plasticizer  Adkcizer C-8                    40 parts by weight
Lubricant    Sinaka Lead DS-2                1 part by weight Each of compositions A to E was kneaded in a roll mill at a temperature of 160° C. (A) or 180° C. (B to E), and each of the resulting sheets of these compositions was pelletized.

Respective pellets were extrusion-coated on the above-mentioned enamel wire by the use of an extruder of 40 mm OD and 28 L/D. At that time, the main insulating layer and the outer protecting layer were combined as shown in the following table.

TABLE

|  | Example 1 | Example 2 | Example 3 | Example 4 | Comp. Example 1 | Comp. Example 2 | Comp. Example 3 | Comp. Example 4 |
|---|---|---|---|---|---|---|---|---|
| Enamel layer | Polyamideimide | ← Same as left → | | | ← Same as left → | | | |
| Main insulating layer | A Crosslinking by electron beams (30 M rad.) | A | A | A | A | A ← Same as left → | A | B |
| Outer protective layer | B | B Crosslinking by electron beams (30 M rad.) | E ← Same as left → | D | C | | 6-nylon | A Crosslinking by electron beams (30 M rad.) |
| Dielectric breakdown voltage (test for coil) | No dielectric breakdown at 10,000 volts | ← Same as left → | | | | Caused dielectric breakdown at 10,000 volts | | ← Same as left → |
| Motor life, hr | >20,000 | >20,000 | >20,000 | 15,000 | 5,000 | 5,000 | 3,000 | 3,000 |

As shown in the table, in Example 1 and Comparative Examples 1 and 3, polyethylene composition A was applied on the enamel wire. The polyethylene layer was crosslinked by exposing the coated wire to electron beams of 1 MeV. Then, as the outer protective layer, composition B was applied in Example 1, composition C in Comparative Example 1 and 6-nylon in Comparative Example 3. In Examples 2, 3 and 4, composition A was applied and then, as the outer protective layer, compositions B, E and D were applied, respectively. In Comparative Example 4, composition B was applied and then composition A was applied thereon. Thereafter, in Examples 2, 3 and 4 and Comparative Example 4, irradiation of electron beams of 1 MeV was applied to both the main insulating layer and the outer protective layer. Each of the insulated wires of Examples 1 to 4 and Comparative Examples 1, 3 and 4 thus obtained had a polyethylene layer of 0.3 mm thickness and a polyvinyl chloride layer of 0.2 mm thickness. The insulated wire of Comparative Example 2 obtained had only a composition A layer of 0.5 mm thickness irradiated by electron beams of 1 MeV.

The coated wires produced in Example 1 and Comparative Examples 2, 3 and 4 were tested for dielectric breakdown voltage by the following method.

The middle part (50 cm long) of a sample coated wire (1 m long) was immersed in water under the following two conditions. The test piece was subjected to a dielectric strength test (6 kv, 5 min, AC) in the same water and then the dielectric breakdown voltage (BVD) of the test piece was measured by the use of a method of linear rise voltage in which the electric voltage was increased at a rate of 0.5 kv/sec.

Figure 4:
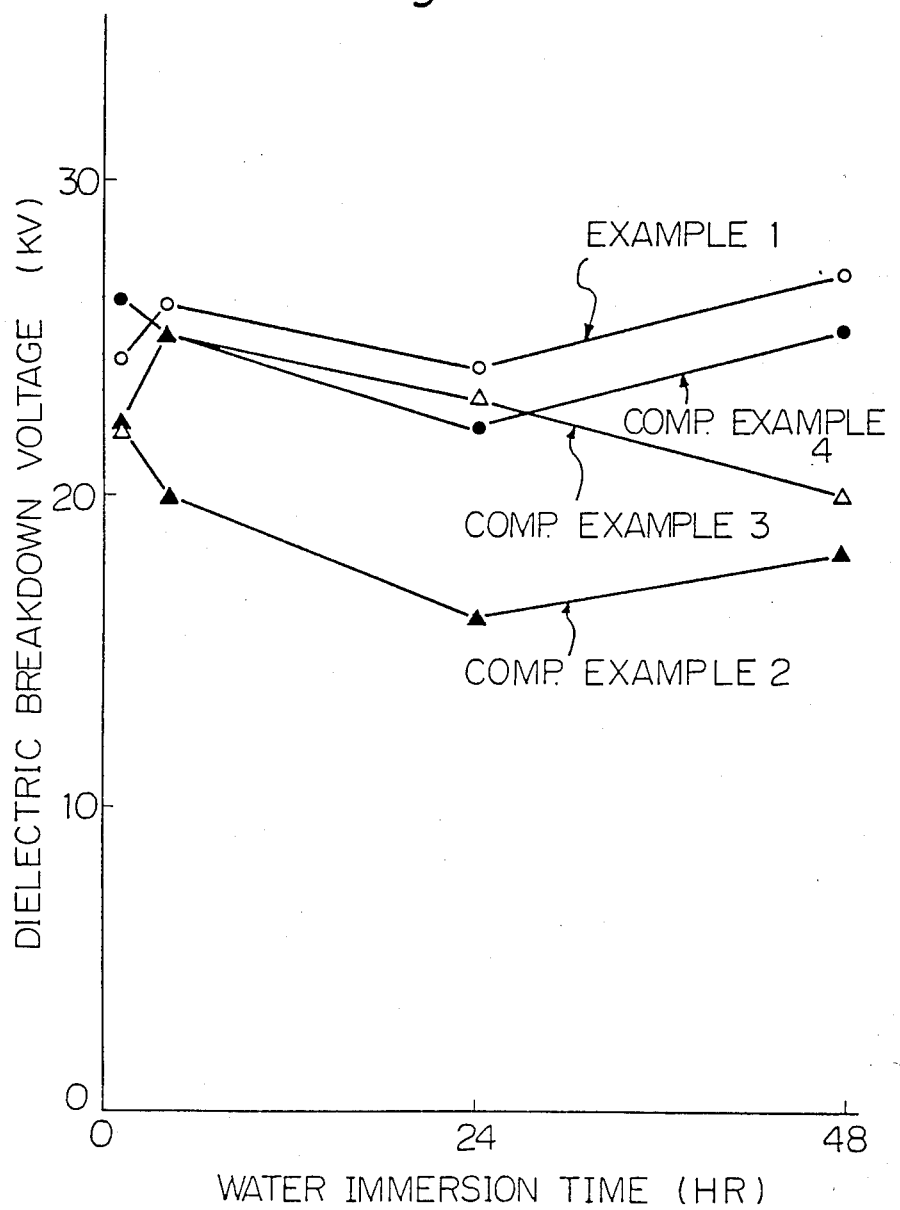
FIG. 4 is a graph showing the relationship between water immersion time at 55° C. and dielectric breakdown voltage, for the coated wire used in this invention (Example 1) and coated wires of Comparative Examples 2, 3 and 4.
Figure 5:
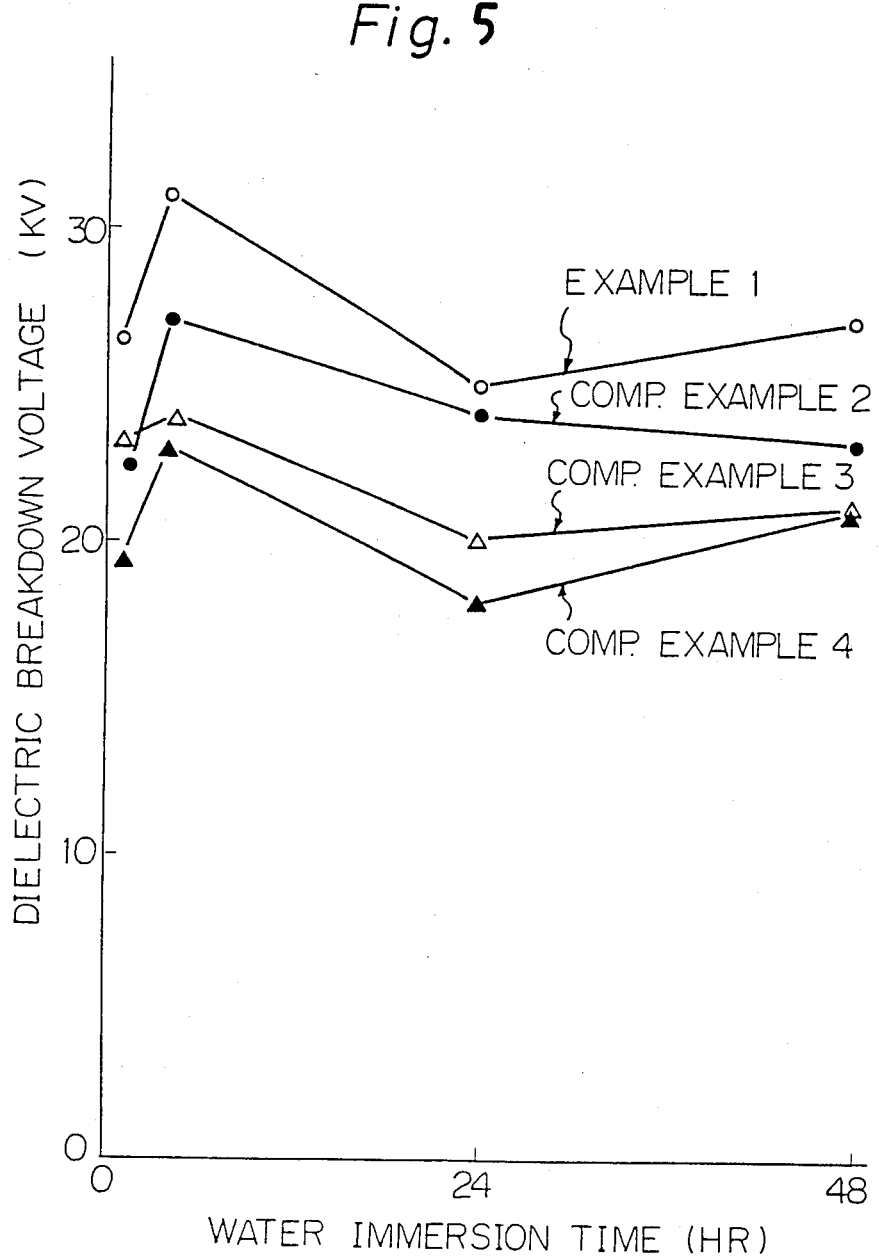
FIG. 5 is a graph showing the relationship between water immersion time at 75° C. and the dielectric breakdown voltage for the coated wire of this invention (Example 1) and coated wires of Comparative Examples 2, 3 and 4.

Immersion conditions
55° C. 0.5 to 1 hr, 4 hr, 24 hr, 48 hr
75° C. 0.5 to 1 hr, 4 hr, 24 hr, 48 hr The results were as shown in FIG. 4 (when immersed in water of 55° C.) and FIG. 5 (when immersed in water of 75° C.).

As is obvious from FIGS. 4 and 5, the coated wire of Example 1 showed the highest dielectric breakdown voltage at each measurement point. Thus, this wire is excellent in water resistance.

Figure 2:
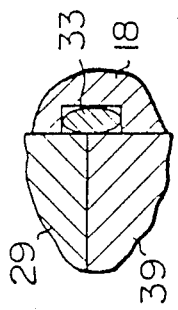
FIG. 2 is an enlarged view of the lower sealing part of FIG. 1.

Each of the coated wires produced in Examples 1 to 4 and Comparative Examples 2 to 4 was wound into a test coil having the structure as actual coils for the motor shown in FIGS. 1-3. The test coil was immersed in a 50% aqueous propylene glycol solution for 2 months. Then, the coil was subjected to a dielectric strength test by applying sine wave AC voltages of 2,000, 3,000, 4,000, 5,000, 6,000 and 10,000 volts. The results are shown in the table. As is seen in the table, the coated wires of Examples 1 to 4 caused no dielectric breakdown even at 10,000 volts, while the coated wires of Comparative Examples 2 to 4 did cause dielectric breakdown at 10,000 volts.

All coated wires produced in Examples 1 to 4 and Comparative Examples 1 to 4 were formed into respective coils and each coil was incorporated into a water-tight type submersible motor of 37 kw as shown in FIGS. 1 to 3, using an aromatic polyamide paper as a slot liner.

These submersible motors were subjected to long period operation under conditions of 90° C. coil temperature, 400 v and 50 cycles to measure the life of each motor. The life of the motor is expressed in the number of hours up to the time when the insulation resistance of a coil system was reduced to 50%. The results are shown in the table.

As is shown in the table, in the submersible motors using the coated wires of Examples 1 to 3, insulation resistance hardly dropped even after 20,000 hours of operation. However, in the submersible motor using the coated wire of Example 4, insulation resistance dropped at 15,000 hours. On the other hand, in the submersible motor using the coated wire of Comparative Example 1, insulation resistance dropped markedly at 5,000 hours. This indicates that the number average polymerization degree of polyvinyl chloride of the outer protective layer placed on the crosslinked polyethylene layer in the coated wire has an effective action on the waterproof property of the coil winding. Comparative Examples 2 and 3 are examples of submersible motors using conventional coated wires. In both of these motors, insulation resistance dropped at 5,000 hours or less. This indicates that the water-tight wire (as primary winding for motors) according to the first aspect of this invention is far superior to conventional coated wires. In the submersible motor using the coated wire of Comparative Example 4 in which the materials of the main insulating layer and the outer protective layer used in the coated wire of Example 2 were used as materials of the outer protective layer and the main insulating layer, respectively, insulation resistance dropped at 3,000 hours. This indicates that the meritorious effect of this invention is brought about not by the mere combination of two coating layers (the crosslinked polyethylene layer and the polyvinyl chloride layer) of the coated wire used as a primary winding but by the order in which these two layers are placed.

EXAMPLE 5

A coated wire was produced in the same manner as in Example 1, except that the polyethylene composition used in Example 1 was replaced by a composition using a crystalline polypropylene as a base material (hereinafter the composition is referred to as composition F and has the following formulation) and crosslinking by irradiation of electron beams was omitted.

| Composition F | | |
|---|---|---|
| Noblen BC8B (polypropylene manufactured by Mitsubishi Petrochemical Co., Ltd.) | | 100 parts by weight |
| Antioxidant | Nocrac 300 (manufactured by Ouchi Shinko) Chemical Industrial Co., Ltd.) | 0.3 part by weight |
| Copper damage inhibitor | Mark CFA-1 (manufactured by Adeka Argus Chemical Co., Ltd.) | 0.3 part by weight |

In the same manner as in Example 1, this coated wire was incorporated into the submersible motor of FIGS. 1 to 3 and the life of the resulting motor was measured. Insulation resistance hardly dropped even after 20,000 hours.

As will be appreciated from the above explanation and examples, the submersible motor of the water-tight type using a coated wire with three coating layers for its primary winding has at least several times longer life in conventional motors when used for the same purpose and thus its practical value is very high. Its extended life is attributed to the excellent dielectric breakdown characteristics and resistance to exterior damage of the water-tight wire employed for the winding. This wire also sufficiently suppresses the occurrence of water-treeing during submerged use of the motor. Accordingly, a submersible motor using this type of wire especially of a construction as shown in FIGS. 1–3 has advantageous characteristics.

Obviously, numerous additional modifications and variations of the present invention are possible in light of the above teachings. It is therefore to be understood that within the scope of the appended claims, the invention may be practiced otherwise as specifically described herein.

What is claimed as new and desired to be secured by Letters Patent of the United States is:

1. A submerisible motor comprising:
   a primary winding;
   said primary winding being formed from water-tight wire, said wire comprising:
   a conductor;
   a heat resistant enamel layer formed from a polymer material selected from the group consisting of a polyamideimide and a polyepoxide;
   a main insulating layer of a cross-linked polyethylene; and
   an outer protective layer consisting essentially of a polyvinyl chloride having a number average polymerization degree ranging from 2,000 to 3,500, said three layers being arranged in the order listed.

2. The submersible motor according to claim 1, wherein said polyvinyl chloride in said outer protective layer is crosslinked.

3. The submerisible motor according to claim 1, wherein said conductor comprises a soft copper wire.

4. A submersible motor comprising:
   a motor shaft;
   a rotor mounted on said motor shaft;
   a primary winding;
   a motor housing containing said motor shaft, said primary winding and said rotor;
   said primary winding being formed from water-tight wire, said wire comprising:
   a conductor;

a heat resistant enamel layer formed from a polymer material selected from the group consisting of a polyamideimide and a polyepoxide;

a main insulating layer consisting of a cross-linked polyethylene; and an outer protective layer consisting essentially of a polyvinyl chloride having a number average polymerization degree ranging from 2,000 to 3,500, said three layers being arranged in the order listed.

5. The submersible motor to claim 4, wherein said polyvinyl chloride in said outer protective layer is crosslinked.

6. The submersible motor according to claim 4, wherein said conductor comprises a soft copper wire.

* * * * *